(12) United States Patent
Goldberg et al.

(10) Patent No.: US 8,355,978 B2
(45) Date of Patent: Jan. 15, 2013

(54) SYSTEMS AND METHODS FOR PRICING AND SELLING DIGITAL GOODS

(75) Inventors: Andrew V. Goldberg, Redwood City, CA (US); Jason D. Hartline, Seattle, WA (US); Andrew K. Wright, Monroe Township, NJ (US)

(73) Assignee: Intertrust Technologies Corp., Sunnyvale, CA (US)

( * ) Notice: Subject to any disclaimer, the term of this patent is extended or adjusted under 35 U.S.C. 154(b) by 1766 days.

(21) Appl. No.: 11/262,031

(22) Filed: Oct. 27, 2005

(65) Prior Publication Data

US 2006/0106714 A1 May 18, 2006

Related U.S. Application Data

(63) Continuation of application No. 09/666,339, filed on Sep. 21, 2000, now Pat. No. 6,985,885.

(60) Provisional application No. 60/155,458, filed on Sep. 21, 1999.

(51) Int. Cl.
G06Q 40/00 (2012.01)
(52) U.S. Cl. .......................................... 705/37; 705/26.1
(58) Field of Classification Search ............... 705/37, 705/26.1
See application file for complete search history.

(56) References Cited

U.S. PATENT DOCUMENTS

| | | | |
|---|---|---|---|
| 107,413 | A | 9/1870 | Shearer et al. |
| 4,672,572 | A | 6/1987 | Alsberg |
| 4,799,156 | A | 1/1989 | Shavit et al. |
| 4,823,264 | A | 4/1989 | Deming |
| 4,827,508 | A | 5/1989 | Shear |
| 4,930,073 | A | 5/1990 | Cina, Jr. |

(Continued)

FOREIGN PATENT DOCUMENTS

AU      A-36815/1997      2/1998

(Continued)

OTHER PUBLICATIONS

Azuma, Kazuoki, *Weighted Sums of Certain Dependent Random Variables*, Tohoku Mathematical Journal, vol. 19, No. 3, 1967, pp. 357-367.

(Continued)

*Primary Examiner* — Daniel Felten
(74) *Attorney, Agent, or Firm* — Finnegan, Henderson, Farabow, Garrett & Dunner LLP

(57) ABSTRACT

Systems and methods are provided for pricing, selling, and/or otherwise distributing electronic content using auction mechanisms. A randomized auction mechanism is used to determine both the number of goods that are sold and the selling price. The auction mechanism automatically adapts to the bid distribution to yield revenue that is competitive with that which could be obtained if the vendor were able to determine the optimal fixed price for the goods. In one embodiment a set of bids is randomly or quasi-randomly partitioned into two or more groups. An optimal threshold is determined for each group, and this threshold is then used to select winning bids from one or more of the other groups. In another embodiment, each bid is compared to a competing bid that is randomly or quasi-randomly selected from the set of bids. If the bid is less than the randomly-selected competing bid, the bid is rejected. Otherwise, the bid is accepted and the bidder buys the auctioned item at the price of the randomly-selected bid.

18 Claims, 15 Drawing Sheets

Vickrey Auction for k Items

| Bidder | Bid |
|---|---|
| 1 | $8 |
| 2 | $5 |
| 3 | $2 |
| 4 | $7 |
| 5 | $9 |
| 6 | $4 |
| 7 | $5 |
| 8 | $6 |
| 9 | $2 |
| 10 | $4 | k = 1; Bidder 5 wins and pays $8 k = 3; Bidders 1, 4, and 5 win and each pays $6

U.S. PATENT DOCUMENTS

| | | |
|---|---|---|
| 5,103,476 A | 4/1992 | Waite et al. |
| 5,111,390 A | 5/1992 | Ketcham |
| 5,224,163 A | 6/1993 | Gasser et al. |
| 5,319,705 A | 6/1994 | Halter et al. |
| 5,343,527 A | 8/1994 | Moore |
| 5,390,330 A | 2/1995 | Talati |
| 5,491,800 A | 2/1996 | Goldsmith et al. |
| 5,530,235 A | 6/1996 | Stefik et al. |
| 5,534,975 A | 7/1996 | Stefik et al. |
| 5,615,109 A | 3/1997 | Eder |
| 5,629,980 A | 5/1997 | Stefik et al. |
| 5,634,012 A | 5/1997 | Stefik et al. |
| 5,638,443 A | 6/1997 | Stefik et al. |
| 5,640,546 A | 6/1997 | Gopinath et al. |
| 5,640,569 A | 6/1997 | Miller et al. |
| 5,692,047 A | 11/1997 | McManis |
| 5,715,403 A | 2/1998 | Stefik |
| 5,724,488 A | 3/1998 | Prezioso |
| 5,745,678 A | 4/1998 | Herzberg et al. |
| 5,748,960 A | 5/1998 | Fischer |
| 5,757,914 A | 5/1998 | McManis |
| 5,797,127 A | 8/1998 | Walker et al. |
| 5,809,144 A | 9/1998 | Sirbu et al. |
| 5,835,896 A | 11/1998 | Fisher et al. |
| 5,873,068 A | 2/1999 | Beaumont et al. |
| 5,889,799 A | 3/1999 | Grossman et al. |
| 5,890,138 A | 3/1999 | Godin et al. |
| 5,892,900 A | 4/1999 | Ginter et al. |
| 5,897,620 A | 4/1999 | Walker et al. |
| 5,905,975 A | 5/1999 | Ausubel |
| 5,910,987 A | 6/1999 | Ginter et al. |
| 5,915,019 A | 6/1999 | Ginter et al. |
| 5,920,861 A | 7/1999 | Hall et al. |
| 5,926,796 A | 7/1999 | Walker et al. |
| 5,940,504 A | 8/1999 | Griswold |
| 5,943,422 A | 8/1999 | Van Wie et al. |
| 6,014,627 A | 1/2000 | Togher et al. |
| 6,021,398 A | 2/2000 | Ausubel |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,055,518 A | 4/2000 | Franklin et al. |
| 6,112,181 A | 8/2000 | Shear et al. |
| 6,157,721 A | 12/2000 | Shear et al. |
| 6,167,386 A | 12/2000 | Brown |
| 6,185,683 B1 | 2/2001 | Ginter et al. |
| 6,223,166 B1 * | 4/2001 | Kay ............................... 705/26 |
| 6,226,618 B1 | 5/2001 | Downs et al. |
| 6,236,977 B1 | 5/2001 | Verba et al. |
| 6,240,411 B1 | 5/2001 | Thearling |
| 6,260,024 B1 | 7/2001 | Shkedy |
| 6,263,334 B1 | 7/2001 | Fayyad et al. |
| 6,266,652 B1 | 7/2001 | Godin et al. |
| 6,324,519 B1 | 11/2001 | Eldering |
| 6,398,245 B1 | 6/2002 | Gruse et al. |
| 6,430,537 B1 | 8/2002 | Tedesco et al. |
| 6,443,841 B1 | 9/2002 | Rossides |
| 6,449,612 B1 | 9/2002 | Bradley et al. |
| 6,466,977 B1 | 10/2002 | Sitaraman et al. |
| 6,487,541 B1 | 11/2002 | Aggarwal et al. |
| 6,501,765 B1 | 12/2002 | Lu et al. |
| 6,522,946 B1 | 2/2003 | Weis |
| 6,530,537 B2 | 3/2003 | Hanlon |
| 6,556,951 B1 | 4/2003 | Deleo et al. |
| 6,560,580 B1 | 5/2003 | Fraser et al. |
| 6,564,192 B1 | 5/2003 | Kinney et al. |
| 6,587,837 B1 | 7/2003 | Spagna et al. |
| 6,601,036 B1 | 7/2003 | Walker et al. |
| 6,611,812 B2 | 8/2003 | Hurtado et al. |
| 6,647,373 B1 | 11/2003 | Carlton-Foss |
| 6,785,671 B1 | 8/2004 | Bailey et al. |
| 6,799,165 B1 | 9/2004 | Boesjes |
| 6,834,110 B1 | 12/2004 | Marconcini et al. |
| 6,834,272 B1 | 12/2004 | Naor et al. |
| 6,847,939 B1 | 1/2005 | Shemesh |
| 6,876,309 B1 | 4/2005 | Lawrence |
| 6,926,796 B1 | 8/2005 | Nishida et al. |
| 6,954,731 B1 | 10/2005 | Montague |
| 6,959,288 B1 | 10/2005 | Medina et al. |
| 6,974,412 B2 | 12/2005 | Dobrovolny |
| 7,047,242 B1 | 5/2006 | Ponte |
| 7,200,571 B1 | 4/2007 | Jenniges et al. |
| 7,249,085 B1 | 7/2007 | Kinney et al. |
| 7,516,089 B1 | 4/2009 | Walker et al. |
| 2002/0013631 A1 | 1/2002 | Parunak et al. |
| 2002/0165817 A1 | 11/2002 | Rackson et al. |
| 2005/0289043 A1 | 12/2005 | Maudlin |

FOREIGN PATENT DOCUMENTS

| | | |
|---|---|---|
| AU | A-36816/1997 | 2/1998 |
| AU | A-36840/1997 | 2/1998 |
| EP | 0 128 672 A1 | 12/1984 |
| EP | 0 399 822 A2 | 11/1990 |
| EP | 0 421 409 A2 | 4/1991 |
| EP | 0 565 314 A2 | 10/1993 |
| EP | 0 715 247 A1 | 6/1996 |
| EP | 0 913 757 A2 | 5/1999 |
| GB | 2 264 796 A | 9/1993 |
| WO | WO 90/02382 | 3/1990 |
| WO | WO 92/22870 | 12/1992 |
| WO | WO 93/01550 | 1/1993 |
| WO | WO 94/03859 | 2/1994 |
| WO | WO 94/06103 | 3/1994 |
| WO | WO 96/27155 | 9/1996 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 98/09144 | 9/1998 |
| WO | WO 98/45768 | 10/1998 |
| WO | WO 99/01815 | 1/1999 |
| WO | WO 99/24928 | 5/1999 |
| WO | WO 99/27476 A | 6/1999 |
| WO | WO 99/48296 | 9/1999 |
| WO | WO 01/10076 | 2/2001 |

OTHER PUBLICATIONS

Borodin, A., et al., "Online Computation and Competitive Analysis," Cambridge University Press, 1998.

Berkovits, S., et al., "Authentication of Mobile Agents," *Lecture Notes in Computer Science*, vol. 1419: Mobile Agents and Security, G. Vigna, Ed., Springer-Verlag, 1998, pp. 114-136.

Blaze, M., et al., "Decentralized Trust Management," Proceedings IEEE Conference on Security and Privacy, May 1996, pp. 164-173.

Chernoff, Herman, *A Measure of Asymptotic Efficiency for Tests of a Hypothesis Based on the Sum of Observations*, Annals of Math. Stat., vol. 23, 1952, pp. 493-509.

Chess, D., "Security Issues in Mobile Code Systems," *Lecture Notes in Computer Science*, vol. 1419: Mobile Agents and Security, G. Vigna, Ed., Springer-Verlag, 1998, pp. 1-14.

Cormen, T., et al., *Introduction to Algorithms*, The MIT Press, 1990.

Ellison, C., et al., "SPKI Certificate Theory," Internet Engineering Task Force (IETF) RFC 2693, Sep. 1999, 41 pages, available at http://www.ietf.org/rfc/rfc2693.txt?number=2693.

"Frequently Asked Questions About Auction Types", available online at http://pages.ebay.com/help/basics/f-format.html, as of Sep. 1, 1999, pp. 1-3.

Ginter, et al., "Trusted Infrastructure Support Systems, Methods and techniques for Secure Electronic Commerce Electronic Transactions and Rights management," U.S. Appl. No. 08/699,712, filed Aug. 12, 1996.

Goldberg, Andrew V., et al., "Competitive Auctions," Sep. 14, 1999, Draft, InterTrust Technologies Corp., 460 Oakmead Parkway, Sunnyvale, CA 94086, 17 pages.

Goldberg, Andrew V., et al., "Competitive Auctions," Sep. 20, 1999, Draft, InterTrust Technologies Corp., 460 Oakmead Parkway, Sunnyvale, CA 94086, 17 pages.

Goldberg, Andrew V., et al., "Competitive Auctions for Multiple Digital Goods," May 2, 2000, STAR Lab., InterTrust Technologies Corp., 4750 Patrick Henry Dr., Santa Clara, CA 95054, 10 pages.

Gong, L., et al., "Signing, Sealing and Guarding Java™ Objects," *Lecture Notes in Computer Science*, vol. 1419: Mobile Agents and Security, G. Vigna, Ed., Springer-Verlag, 1998, pp. 206-216.

Harkavy, Michael, et al. Electronic Auctions with Private Bids, In Proc. of the 3$^{rd}$ USENIX Workshop on Electronic Commerce, USENIX Assoc., 1998, pp. 61-73.

Hohl, F., "Time Limited Blackbox Security: Protecting Mobile Agents From Malicious Hosts," Institute of Parallel and Distributed High-Performance Systems (IPVR), University of Stuttgart, Germany, 1998, pp. 92-113.

Knuth, Donald E., "The Art of Computer Programming: vol. 2, Seminumerical Algorithms," 3d ed., Addison-Wesley, 1998, pp. 1-193.

Menzes, Alfred J., *Key Management Techniques*, Handbook of Applied Cryptography, Chapter 13, 1996, pp. 543-590.

"Microsoft Site Server 3.0, Commerce Edition, Online Auctions," Microsoft Corporation, 1998, 33 pages.

"Microsoft® Authenticode™ Technology, Ensuring Accountability and Authenticity for Software Components on the Internet," Microsoft Corporation, Oct. 1996, 5 introductory pages and pp. 1-10.

Morwani, R., et al., *Randomized Algorithms*, Cambridge University Press, 1995.

Mullen, Tracy, et al., "Market-based Negotiations for Digital Library Services," 2nd USENIX Workshop on Electronic Commerce. 1996.

Nash, John, *Noncooperative Games*, Annals of Math., vol. 54, No. 2, 1951, pp. 286-295.

O'Malley, K., et al., "An API for Internet Auctions," Dr. Dobb's Journal, pp. 70-74, Sep. 1998.

Roth, A., et al., *Two-Sided Matching: A Study in Game-Theoretic Modeling and Analysis*, Cambridge University Press, 1990.

Sairamesh, J., et al., "Economic Framework for Pricing and Charging in Digital Libraries," D-Lib Magazine, Feb. 1996, ISSN 1082-9873, 10 pages.

Sander, T., et al., "Protecting Mobile Agents Against Malicious Hosts," *Lecture Notes in Computer Science*, vol. 1419: Mobile Agents and Security, G. Vigna, Ed., Springer-Verlag, Feb. 1998, 16 pages.

Sander, T., et al., "Towards Mobile Cryptography," *International Computer Science Institute*, Berkeley, CA, TR-97-049, Nov. 22, 1997, cover page and pp. 1-14.

Shapley, L. S., et al., *The Assignment Game I: The Core*, Int. J. of Game Theory, vol. 1, 1972, pp. 111-130.

Sibert, Olin, et al., "DigiBox: A Self-Protecting Container for Information Commerce, Proceedings of the First USENIX Workshop on Electronic Commerce," New York, NY, Jul. 1995, 9 pages.

Sibert, Olin, et al., "Securing the Content, Not the Wire, for Information Commerce," InterTrust Technologies Corporation, 1996, 12 pages.

Sibert, et al., "Systems and Methods for Using Cryptography to Protect Secure and Insecure Computing Environments," U.S. Appl. No. 09/628,692, filed Jul. 28, 2000.

Sleator, Daniel D., et al., *Amortized Efficiency of List Update and Paging Rules*, Communications of the ACM, vol. 28, No. 2, 1985, pp. 202-208.

Stefik, M., "Chapter 7, Classification, Introduction to Knowledge Systems," Morgan Kaufmann Publishers, Inc., 1995, pp. 543-607.

Stefik, M., "Letting Loose the Light: Igniting Commerce in Electronic Publication," Xerox PARC, Palo Alto, CA, 1994-1995, 35 pages.

Stefik, M., "Letting Loose the Light: Igniting Commerce in Electronic Publication," Internet Dreams: Archetypes, Myths, and Metaphors. Massachusetts Institute of Technology, 1996, pp. 219-253.

Stefik, M., "Trusted Systems," Scientific American, Mar. 1997, pp. 78-81.

Varian, Hal, "Buying, Sharing and Renting Information Goods," University of California at Berkeley, Dec. 1994, May 14, 1999, pp. 1-19.

Varian, Hal, "Economic Mechanism Design for Computerized Agents," School of Information Management and Systems, University of California at Berkeley, 1995, 11 pages.

Varian, Hal, "Pricing Electronic Journals," D-Lib Magazine, Jun. 1996, ISSN 1082-9873, 3 pages.

Varian, Hal, "Pricing Information Goods," University of Michigan, Jun. 15, 1995, pp. 1-7.

Vickrey, W., "Counter speculation, Auctions, and Competitive Sealed Tenders," *The Journal of Finance*, vol. 16, Cambridge University Press, 1961, pp. 8-37.

White, S., et al., "ABYSS: A Trusted Architecture for Software Protection," IEEE Computer Society Conference on Security and Privacy, 1987, pp. 38-51.

Zipf, G., *Human Behavior and the Principle of Least Effort*, Addison-Wesley Press, Inc., 1949.

Office Action mailed Oct. 6, 2003, for U.S. Appl. No. 09/666,339.

Office Action mailed Aug. 11, 2004, for U.S. Appl. No. 09/666,339.

Notice of Allowance mailed May 27, 2005, for U.S. Appl. No. 09/666,339.

Supplemental Notice of Allowability mailed on Sep. 21, 2005, for U.S. Appl. No. 09/666,339.

The Decision Made by Boards of Appeal of the European Patent Office on Jul. 9, 2002.

Communication from European Patent Office mailed Aug. 30, 2002, for Patent Application No. 00 963 655.6-2221.

Communication from European Patent Office mailed Sep. 30, 2004, for Patent Application No. 00 963 655.6-2221.

Summons from European Patent Office mailed Dec. 29, 2005, for Patent Application No. 00 963 655.6-2221.

Varian, Economic Mechanism Design for Computerized Agents, In Proc. of the 1$^{st}$ USENIX Workshop on Electronic Commerce, USENIX Assoc., 1995, pp. 13-21.

Goodnoise.com internet archive, 19990208 (http://web.archive.org/web/19990208013455/www.goodnoise.com/ (2 pages).

Office Action issued Sep. 7, 2007 in U.S. Appl. No. 11/262,209, filed Oct. 28, 2005.

Office Action issued Apr. 15, 2008 in U.S. Appl. No. 11/262,209, filed Oct. 28, 2005.

Advisory Action issued Jul. 25, 2008 in U.S. Appl. No. 11/262,209, filed Oct. 28, 2005.

Office Action issued Oct. 15, 2008 in U.S. Appl. No. 11/262,209, filed Oct. 28, 2005.

Office Action issued May 27, 2009 in U.S. Appl. No. 11/262,209, filed Oct. 28, 2005.

Office Action issued Dec. 24, 2009 in U.S. Appl. No. 11/262,209, filed Oct. 28, 2005.

Office Action issued Jun. 22, 2010 in U.S. Appl. No. 11/262,209, filed Oct. 28, 2005.

Notice of Allowance issued Dec. 21, 2010 in U.S. Appl. No. 11/262,209, filed Oct. 28, 2005.

\* cited by examiner

Vickrey Auction for k Items

| Bidder | Bid |
|---|---|
| 1 | $8 |
| 2 | $5 |
| 3 | $2 |
| 4 | $7 |
| 5 | $9 |
| 6 | $4 |
| 7 | $5 |
| 8 | $6 |
| 9 | $2 |
| 10 | $4 | k = 1; Bidder 5 wins and pays $8 k = 3; Bidders 1, 4, and 5 win and each pays $6

Fig. 1

| Bidder | Bid |
|---|---|
| 1 | $2 |
| 2 | $4 |
| 3 | $3 |
| 4 | $5 |
| 5 | $2 |
| 6 | $6 |
| 7 | $2 |
| 8 | $4 |
| 9 | $2 |
| 10 | $2 |
| 11 | $3 |
| 12 | $5 |
| 13 | $1 |
| 14 | $2 |
| 15 | $4 |
| 16 | $2 |
| 17 | $3 |
| 18 | $1 |
| 19 | $2 |
| 20 | $1 |

Fig. 4A

| Threshold | Revenue of Shaded Sample | Revenue of Unshaded Sample |
|---|---|---|
| 1 | $10 | $10 |
| 2 | $16 | $18 |
| 3 | $12 | $15 |
| 4 | $ 8 | $16 |
| 5 | $ 5 | $10 |
| 6 | $ 0 | $ 6 |

Fig. 4B

| Bidder | Bid | Weight |
|---|---|---|
| 1 | $2 | 2 |
| 2 | $4 | 6 |
| 3 | $3 | 9 |
| 4 | $1 | 10 |
| 5 | $2 | 12 |
| 6 | $5 | 17 |
| 7 | $3 | 20 |
| 8 | $4 | 24 |
| 9 | $3 | 27 |
| 10 | $3 | 30 |

Fig. 6A

| $b_l$ | | Random Number | $b_k$ | | Result |
|---|---|---|---|---|---|
| Bidder | Bid | | Bidder | Bid ($) | |
| 1 | $2 | 20 | 7 | $3 | Lose |
| 2 | $4 | 25 | 9 | $3 | Win |
| 3 | $3 | 11 | 5 | $2 | Win |
| 4 | $1 | 8 | 3 | $3 | Lose |
| 5 | $2 | 3 | 2 | $4 | Lose |
| 6 | $5 | 24 | 8 | $4 | Win |
| 7 | $3 | 13 | 6 | $5 | Lose |
| 8 | $4 | 1 | 1 | $2 | Win |
| 9 | $3 | 30 | 10 | $3 | Win |
| 10 | $3 | 23 | 8 | $4 | Lose |

Fig. 6B

SYSTEMS AND METHODS FOR PRICING AND SELLING DIGITAL GOODS

RELATED APPLICATIONS

This is a continuation of application Ser. No. 09/666,339, entitled "Systems and Methods for Pricing and Selling Digital Goods," filed Sep. 21, 2000 now U.S. Pat. No. 6,985,885, which claims priority from U.S. Provisional Application No. 60/155,458, entitled "Systems and Methods for Pricing and Selling Digital Goods," filed Sep. 21, 1999, which are hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the sale and/or distribution of goods and services. More particularly, the present invention relates to systems and methods for pricing and/or selling goods or services using randomized sampling and other auction techniques.

BACKGROUND OF THE INVENTION

Improvements in digital recording and storage technology, together with the proliferation of digital and analog communication networks, have created a rapidly growing market for digital goods and services. The nature of digital goods is such that they can be reproduced at little cost. Thus, while it can be expensive to produce an original work, the marginal cost of producing additional copies is typically a negligible fraction of this initial cost. For example, commercial sound recordings, business reports, computer programs, and movies each typically cost a substantial sum to create; however, near-perfect digital copies can be produced easily and inexpensively using readily-available equipment. In the case of musical recordings, for example, digital formats such as MPEG-1 Audio Layer 3, or MP3, enable high-quality copies of an original recording to be stored and transmitted with relatively little consumption of disk space or network bandwidth.

While increasing attention has been devoted to the protection of digital and other electronic content from unauthorized copying, distribution, and use, relatively little attention has been paid to another fundamental problem facing the vendor of digital goods—namely, the problem of maximizing the value derived from the sale of those goods. Since digital goods can be produced at negligible marginal cost, they can be supplied in virtually unlimited quantities. Thus, the primary criteria for determining the optimal sale price for a digital work will typically be the utility value that consumers place on the work, which for practical purposes can be approximated by the amount consumers are willing to pay.

Accordingly, one measure of a digital work's value is the aggregate utility that consumers derive from the work. A vendor could recover this amount by charging each individual buyer the maximum amount that each is willing to pay. For example, if a first buyer valued a digitally-recorded movie at $5, a second buyer valued the movie at $8, and a third buyer valued the movie at $1, the vendor could maximize revenue by charging the first buyer $5, the second buyer $8, and the third buyer $1 for a copy of the movie. Of course, this amount will typically be unattainable in practice, as consumers are generally unwilling to pay a higher price than others for the same item simply because the item is more valuable to them. As a result, vendors typically estimate consumer utility via market analysis, and then use those estimates to set a fixed price designed to maximize revenue. In the example described above, for instance, the vendor could maximize revenue by setting the fixed price at $5, thus obtaining a revenue of $10 (i.e., $5 from the first and second buyers). Pay-per-view movies are an example of the use of fixed pricing for the sale of digital or electronic content.

Determining an optimal fixed price can be a difficult task, however, as it requires near-perfect knowledge of consumer utilities. If the price is set too high, an insufficient number of items may be sold; if the price is set too low, insufficient revenue may be collected per item. In the example presented above, if the vendor were to set the price at $6, he or she would only obtain $6 in revenue, as only the second buyer would be willing to purchase the movie. Similarly, if the price were set at $1, the vendor would obtain only $3. Moreover, since the utility value of an item may vary with time—for example, a consumer may not be willing to pay as much for a movie that was released a year ago as for a movie that was released yesterday—the vendor will need to make periodic attempts to re-adjust the fixed price.

In the context of limited-supply goods, auctions are sometimes used to determine the sale price. An advantage of an auction is that if it is properly designed, it will set the price for an item at or near the optimum fixed price. For example, in a conventional English auction bidders compete against each other to "win" an item at the bid price. Bidders continue raising the bid price until it exceeds the utility value of enough of the other bidders that the number of active bidders is equal to the number of items to be sold. Thus, the winning bidders effectively pay some increment above the utility value of the last bidder to withdraw from the auction.

Another auction technique was presented by Vickrey in his classic paper, *Counterspeculation, Auctions and Competitive Sealed Tenders*, Journal of Finance, (16) 8-37 (1961). In a typical Vickrey auction, bidders submit sealed bids to the auctioneer. If k items are being sold, the k highest bids win, but pay a price equal to the highest losing bid. That is, if the bids are ranked in ascending order from 1 to n, the k highest bids each pay the auctioneer an amount equal to the n-k highest bid. FIG. 1 illustrates a Vickrey auction in which ten bidders submit bids for k items. As shown in FIG. 1, if k=1 the highest bidder—in this case bidder 5, with a bid of $9—wins the auction and purchases the item for $8, which is the amount of the second highest bid (submitted by bidder 1). Similarly, if k=3 the three highest bidders (i.e., bidders 1, 4, and 5) win the auction, and each obtain one of the auctioned items for $6, which is the value of the fourth highest bid. A characteristic of the Vickrey auction is that each bidder has an incentive to bid his or her true utility value, since the price that each winning bid will pay is independent of the value of the winning bid itself. Accordingly, there is no reason for bidders to try to guess what other bidders are bidding and to bid incrementally above that value, as such a strategy runs the risk of missing an opportunity to buy the item at a price that is at or below the bidder's utility value, and does nothing to lower the price that the bidder will ultimately pay for the item if he or she wins. Auctions which encourage bidders to bid their true utility values are sometimes referred to as "stable" or "truthful" auctions.

Conventional auction techniques break down, however, if there is an unlimited supply of the goods being auctioned, as is the case with digital goods. (Note that "unlimited supply," as used herein, refers generally to situations in which the seller has an amount of items that equals or exceeds demand, and/or situations in which the seller can reproduce items on demand at negligible marginal cost). For example, if the English auction described above were used to sell unlimited supply goods, bidders would have no incentive to raise the price in successive rounds, since all bids would be satisfied no matter what the bid value. Similarly, the Vickrey auction would be ineffective, as each bidder would pay an amount less than or equal to the lowest bid, which the bidders could set at an arbitrarily low level, knowing that it would nevertheless be satisfied. One way to avoid these problems is to artificially limit the supply of goods. However, it is apparent that this simply reintroduces the need for market analysis, since the problem of determining how to optimally limit supply so as to maximize revenue is typically no easier to solve than that of determining an optimal fixed price.

Accordingly, there is a need for systems and methods which enable the vendor of digital or other goods of unlimited supply to sell those goods without resort to costly and error-prone market analysis, yet which also enable the vendor to obtain a revenue stream that is of approximately the same order of magnitude as the revenue stream the vendor could receive if he or she had perfect information about the market for the goods.

SUMMARY OF THE INVENTION

The present invention provides systems and methods for pricing and selling goods and services of effectively unlimited supply using novel auction techniques. It should be appreciated that the present invention can be implemented in numerous ways, including as a process, an apparatus, a system, a device, a method, or a computer readable medium. Several inventive embodiments of the present invention are described below.

In one embodiment, a system for vending copies of an electronic work is disclosed. The system includes a computer for receiving bids from one or more bidders, and bid sampling logic for selecting (i) a bid from one of the bidders, and (ii) a sample of one or more of the other bids. Processing logic is used to derive a threshold from the sample of bids, and to determine, based on this threshold, whether to vend a copy of the electronic work to the bidder. The system may also include a network interface for sending a copy of the electronic work to the bidder, and payment processing software for collecting payment for the electronic work from the bidder.

In another embodiment, a method is disclosed for distributing copies of an electronic work. There may be an effectively unlimited number of copies the electronic work, and the maximum number of copies that are to be distributed need not be specified in advance. In accordance with this distribution method, a group of bids is received from one or more bidders. A bid is selected from the group, as is a sample of bids drawn from the group of remaining bids. A threshold value is derived from the sample, and the selected bid is compared to the threshold. If the selected bid is greater than or equal to the threshold, a copy of the electronic work is sent to the bidder who submitted the selected bid. This process can be repeated for each bid in the group.

In yet another embodiment, a method for distributing an electronic work is disclosed. A group of bids are received, and a weighting factor is assigned to each bid. A first bid is selected from the group of bids, and another bid is drawn from the group using the weighting factors. For example, the weighting factors can be used to make the probability of drawing a given bid from the group proportional to the relative value of the bid in comparison to the other bids in the group. The value of the first bid is compared to the value of the bid that was drawn from the group, and a copy of the electronic work is distributed to the bidder who submitted the first bid if the first bid is greater than or equal to the other bid.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates the operation of a Vickrey auction.

FIGS. 4A and 4B illustrate the application of a dual-price, optimal threshold auction mechanism to a set of bids.

FIGS. 6A and 6B illustrate the application of a weighted-pairing auction mechanism to a set of bids.

DETAILED DESCRIPTION

Figure 2A:
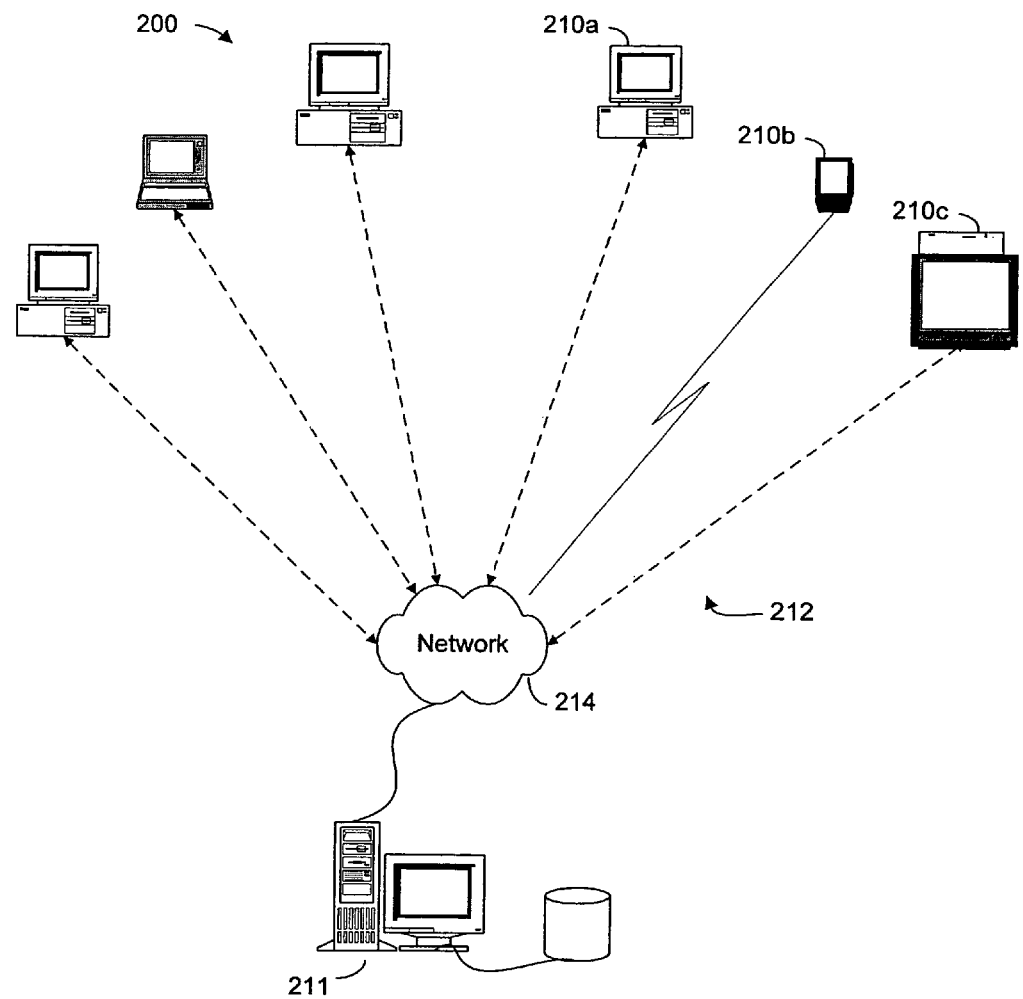
FIGS. 2A, 2B, and 2C illustrate a system for practicing an embodiment of the present invention.

A detailed description of the present invention is provided below. While the invention is described in conjunction with several embodiments, it should be understood that the invention is not limited to any one embodiment. On the contrary, the scope of the invention is limited only by the appended claims, and the invention encompasses numerous alternatives, modifications and equivalents. For example, while several embodiments are described in the context of a system and method for single-round, sealed-bid auctions for goods of effectively unlimited supply, those skilled in the art will recognize that the disclosed systems and methods are readily adaptable for broader application. For example, without limitation, the present invention could readily be applied in the context of multi-round auctions, unsealed bid auctions, and/or auctions for goods of limited supply. Moreover, while numerous specific details are set forth in the following description in order to provide a thorough understanding of the present invention, the present invention can be practiced according to the claims without some or all of these details. Finally, for the purpose of clarity, certain material that is known in the art related to the invention has not been described in detail in order to avoid obscuring the invention.

The following U.S. patents and applications, each of which is assigned to the assignee of the current application, are hereby incorporated in their entirety by reference: Ginter et al., "Systems and Methods for Secure Transaction Management and Electronic Rights Protection," U.S. Pat. No. 5,892,900, issued Apr. 6, 1999 ("the '900 patent"); Ginter et al., "Trusted Infrastructure Support Systems, Methods and Techniques for Secure Electronic Commerce, Electronic Transactions, Commerce Process Control Automation, Distributed Computing, and Rights Management," U.S. patent application Ser. No. 08/699,712, filed Aug. 12, 1996; Shear, "Database Usage Metering and Protection System and Method," U.S. Pat. No. 4,827,508, issued May 2, 1989; and Sibert, "Systems and Methods for Using Cryptography to Protect Secure and Insecure Computing Environments," U.S. patent application Ser. No. 09/628,692, filed Jul. 28, 2000 ("the Sibert application").

Systems and methods are described herein for enabling the efficient pricing and sale of digital goods and/or other goods or services with marginal production costs that are relatively small. These mechanisms can also be advantageously applied in the context of goods of limited supply and/or goods whose marginal cost of reproduction is not small. In a preferred embodiment, a randomized auction mechanism is used to determine both the number of goods that are sold and the selling price. The auction mechanism automatically adapts to the bid distribution to yield revenue that is competitive with that which could be obtained if the vendor were able to determine the optimal fixed price for the goods.

In one embodiment, a set of bids is randomly or quasi-randomly partitioned into two or more groups. An optimal threshold is determined for each group, and this threshold is then used to select winning bids from one or more of the other groups. In another embodiment, each bid is compared to a competing bid that is randomly or quasi-randomly selected from the set of bids. If the bid is less than the randomly-selected competing bid, the bid is rejected. Otherwise, the bid is accepted and the bidder buys the auctioned item at the price of the randomly-selected bid.

An illustrative system 200 for practicing an embodiment of the present invention will now be described with reference to FIGS. 2A, 2B, and 2C. As shown in FIG. 2A, system 200 preferably includes:

- one or more input terminals 210 for receiving bids from users and for displaying information to users;
- at least one server 211 for storing the item(s) to be auctioned and for managing the auction; and
- communication media 212, preferably including a computer network 214 such as the Internet, for communicating information between terminals 210 and server 211.

As described in more detail below, in one embodiment bidders submit bids electronically via network 214 to server 211. Server 211 is operable to send the bidders a list of the items being auctioned and to facilitate entry of bids from terminals 210. Server 211 is also preferably operable to identify the winning bids, to accept and/or process payment for the auctioned item, and to make and/or dispense a copy of the auctioned item to each of the winning bidders. For example, server 211 might comprise a mainframe computer or mini-computer running Microsoft® Site Server 3.0, Commerce Edition software, available from Microsoft Corporation of Redmond, Wash., and using the Auction component of the Site Server software to facilitate implementation of the administrative aspects of running an online auction.

Figure 2B:
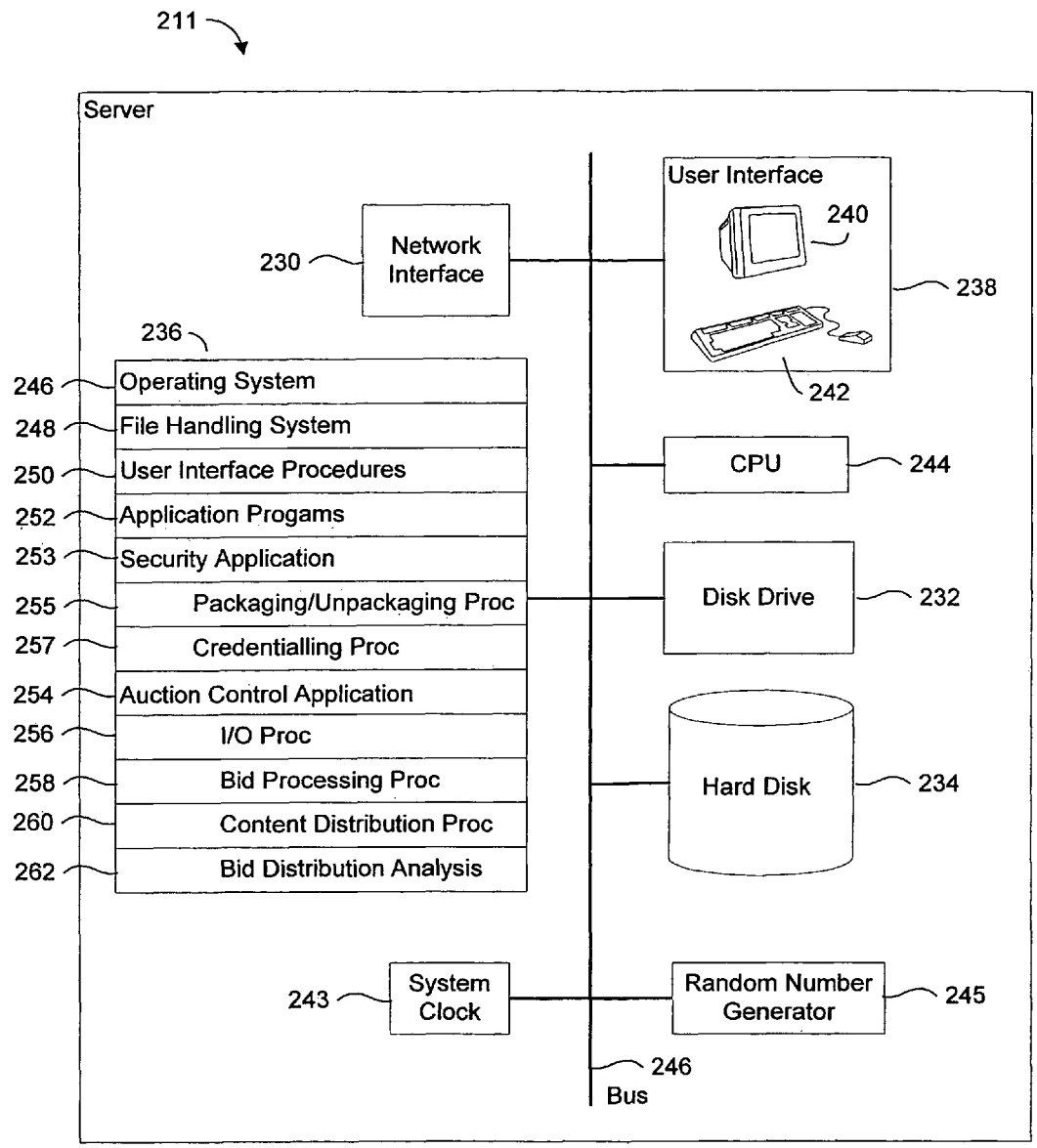
Figure 2C:
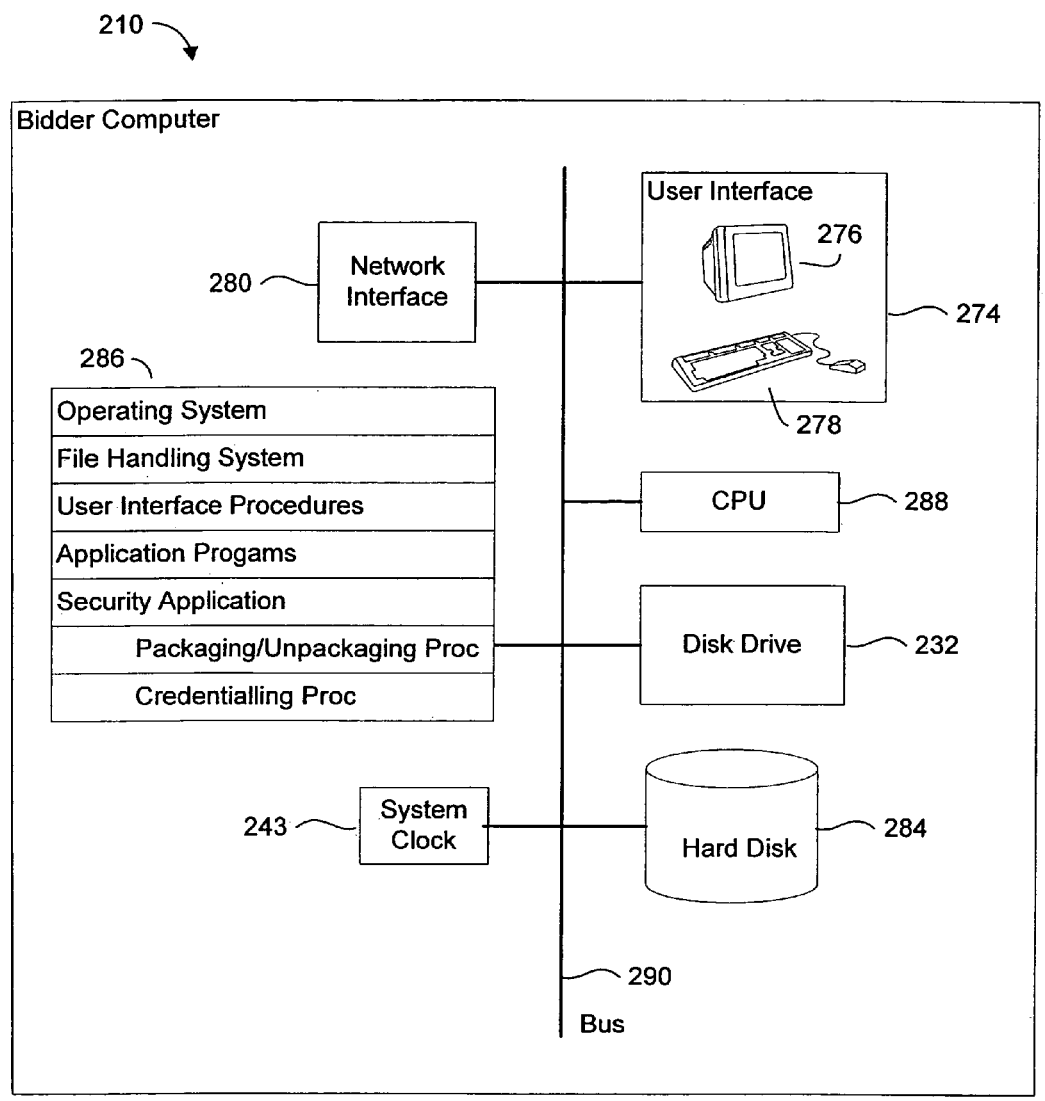

As shown in FIG. 2B, server 211 may include:

- a network interface 230 for connecting server 211 to network 214 and for communicating with terminals 210;
- a magnetic and/or optical disk drive 232 for reading and writing diskettes and/or CDs containing content and program files;
- a non-volatile storage unit 234, such as a hard disk drive, for storing content and program files;
- a system memory unit 236, preferably including both high-speed random access memory (RAM) and read only memory (ROM), for storing system control programs, data, and application programs loaded from disk drive 232, storage unit 234, and/or network interface 230;
- a user interface 238, including a display 240 and one or more input devices 242;
- a system clock 243;
- a central processing unit (CPU) 244;
- an optional random number generation circuit 245; and
- one or more internal buses 246 for interconnecting the aforementioned elements.

The operation of server 211 is controlled primarily by control programs that are executed by the server's CPU 244. These control programs may be stored in system memory 236. In a typical implementation, the programs stored in system memory may include:

- an operating system 246;
- a file handling system 248;
- a set of user interface procedures 250, for handling input from user interface 238 and for displaying output to the user on display 240;
- one or more application programs 252;
- a security module 253 for securely transmitting and receiving data to and from network 214, display 240, and/or disk drives 232 and 234;
- an auction control module 254, discussed in more detail below, for managing an online auction, preferably including modules for transmitting information to bidders; receiving bids; evaluating bids to identify winners and losers; making copies of digital content and transmitting those copies to the winning bidders; obtaining and processing payments from the bidders; recording and analyzing bid distributions; allowing the auctioneer to select the auction mechanism to be used; and responding to auctioneer and/or bidder queries regarding the nature of the auction.

As shown in FIG. 2A, bidders may communicate with server 211 via terminals 210. It will be appreciated that terminal 210 may comprise any suitable mechanism for communicating a bid to server 211. For example without limitation, terminal 210 may comprise a personal computer 210a, a personal digital assistant (PDA) 210b, a television with set-top box 210c, or the like. As shown in FIG. 2C, terminal 210 might include:

- a user interface 274, including a display 276 and one or more input devices 278;
- a network interface 280 for connecting terminal 210 to network 214 and for communicating with server 211;
- storage media 284 operable to store digital content downloaded from server 211;
- system memory 286 for storing digital content and control and security programs that govern the operation of the system and its interaction with network 214 and input/output devices 278;
- a central processing unit 288 for executing program instructions; and one or more internal buses 290 for interconnecting the aforementioned elements.

In a preferred embodiment, communication between server 211 and terminals 210 is performed using a secure protocol such as the Secure Sockets Layer (SSL) protocol, the Internet Engineering Task Force's (IETF) Transport Layer Security (TLS) protocol, and/or the secure HTTP (S-HTTP) protocol to create an effectively secure channel between the server and each terminal and/or to send individual messages securely. For example, SSL can be used by server 211 to verify the identity of a terminal 210 (and/or vice-versa) before valuable content or sensitive financial information is transmitted, and can also be used to facilitate encryption of the information that is ultimately transmitted.

In one embodiment, information is sent between terminals 210 and server 211 using the methods and systems described in the '900 patent, previously incorporated by reference herein. For example, a user's bid can be enclosed in a secure container and sent to server 211, where the secure container is opened and the bid removed. Similarly, in one embodiment server 211 may be operable to send the auctioned item to each winning bidder in a secure container, such as a DIGIBOX® secure container produced by InterTrust Technologies Corporation of Santa Clara, Calif. Moreover, a preferred embodiment uses the systems and methods described, e.g., in the '900 patent, the Sibert application, and/or Menezes et al., *Handbook of Applied Cryptography*, pp. 543-590 (CRC Press 1996), which is hereby incorporated by reference, to attach credentials to the bids and/or the content, thus enabling bidders and/or auctioneers to verify that the bids and auctioned items that they receive have originated from trusted sources. It should be appreciated, however, that the present invention is not limited to a particular security system, and that any suitable container or security scheme can be used. In some embodiments no special security measures are used.

Similarly, it should be appreciated that while FIG. 2A illustrates a system 200 in which bids are entered remotely at computer terminals 210 and forwarded via network 214 to server 211 for processing and storage, in other embodiments other configurations are used. For example, one of ordinary skill in the art will appreciate that bids can be submitted via a variety of additional and/or alternate means, including without limitation facsimile, telephone, email, the postal system, and/or hand delivery. These bids could then be entered manually into server 211 by the auctioneer and/or processed manually. Thus, it should be understood that the system for processing bids shown in FIGS. 2A, 2B, and 2C is intended to be illustrative and not limiting.

In a preferred embodiment, auction control module 254 includes a variety of bid processing procedures 258 for conducting an auction (or lottery) in accordance with the principles of the present invention. Several illustrative procedures will now be described with reference to FIGS. 3A-6.

Figure 3A:
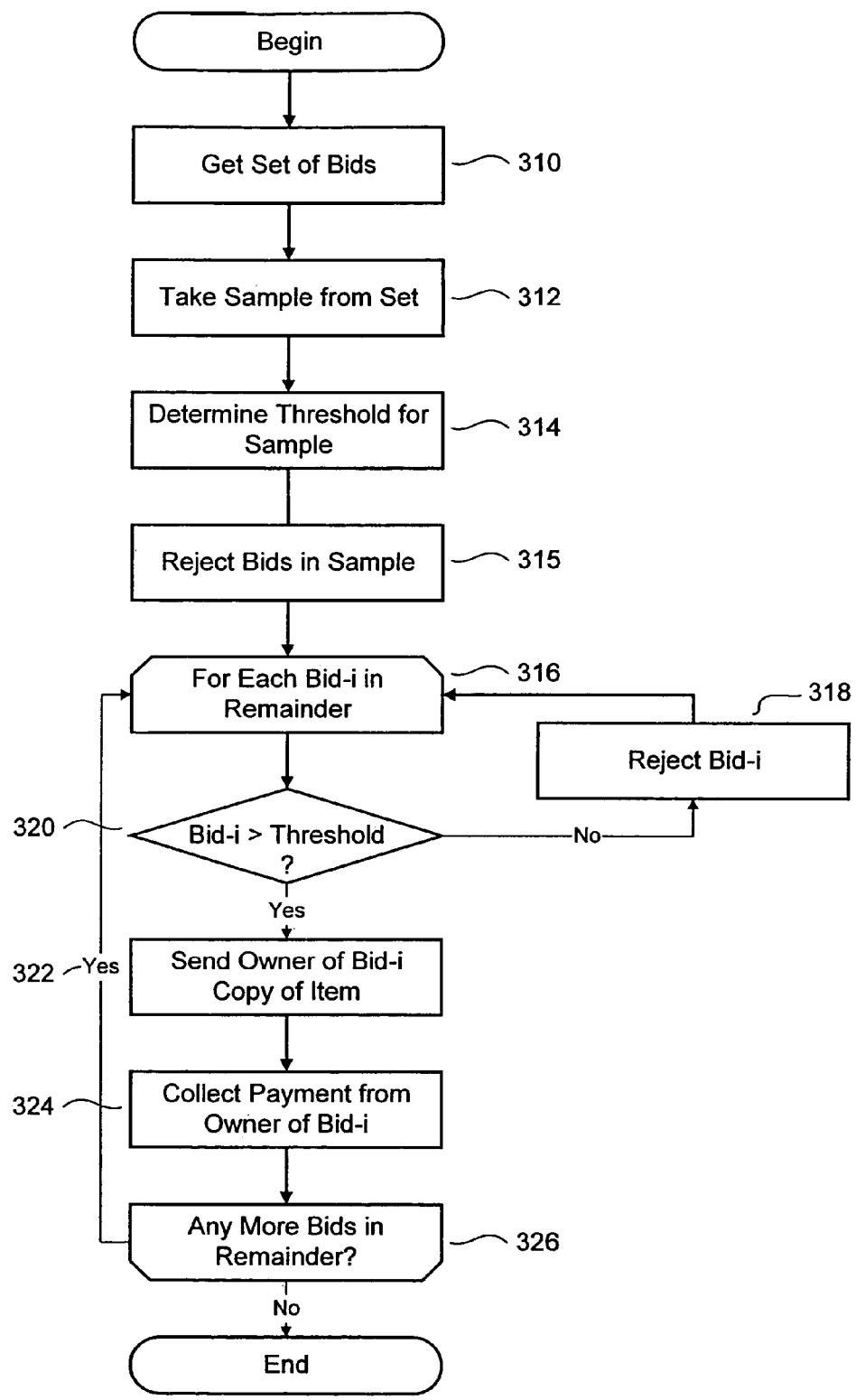
FIGS. 3A, 3B, and 3C are flow charts illustrating sampling-based optimal threshold auction mechanisms in accordance with embodiments of the present invention.

In one embodiment, an optimal threshold for a randomly-selected sample of the bids obtained by server 211 is used to determine the outcome of some or all of the remaining bids. In a preferred embodiment, the optimal threshold of the sample is one that would maximize the revenue obtained from the sample. FIG. 3A is a flow chart illustrating one such sampling-based threshold technique. With reference to FIG. 3A, after gathering a set of bids (310), a sample group of the bids is selected (312). In a preferred embodiment, a pseudo-random sampling of the bids is taken, with the size of the sample being chosen such that the properties of the sample can be expected to be statistically representative of the properties of the entire group of bids. For example, for a relatively large number of bids, n, sample sizes of approximately the square root of n or n/10 have been found to work well. However, it will be appreciated that other suitable sample sizes could be used in accordance with the principles of the present invention.

Referring back to FIG. 3A, an optimal threshold for the sample is determined (314), the threshold being a value that, e.g., maximizes the revenue that could be obtained from the sample. In one embodiment the bids in the sample are then discarded (315). That is, none of the bidders in the sample are allowed to purchase the item, regardless of the price that they bid. This has the beneficial effect of making the price that the winning bidders pay independent of the value that they bid, thus encouraging each bidder to bid his or her true utility value.

The threshold from the sample is then compared against the values of the bids outside the sample (316-326). If a bid value is greater than (or in some embodiments, greater than or equal to) the threshold (a "yes" exit from block 320), then server 211 sends a copy of the item to the bidder (322) and collects payment from the bidder in an amount equal to the threshold (324). If, on the other hand, the bid is less than or equal to (or in some embodiments, less than) the threshold (i.e., a "no" exit from block 320), the bid is rejected (318). In a preferred embodiment, when a bid is rejected a message is sent to the bidder indicating that the bid was unsuccessful. This process is repeated for each of the bids in the remainder.

Figure 3B:
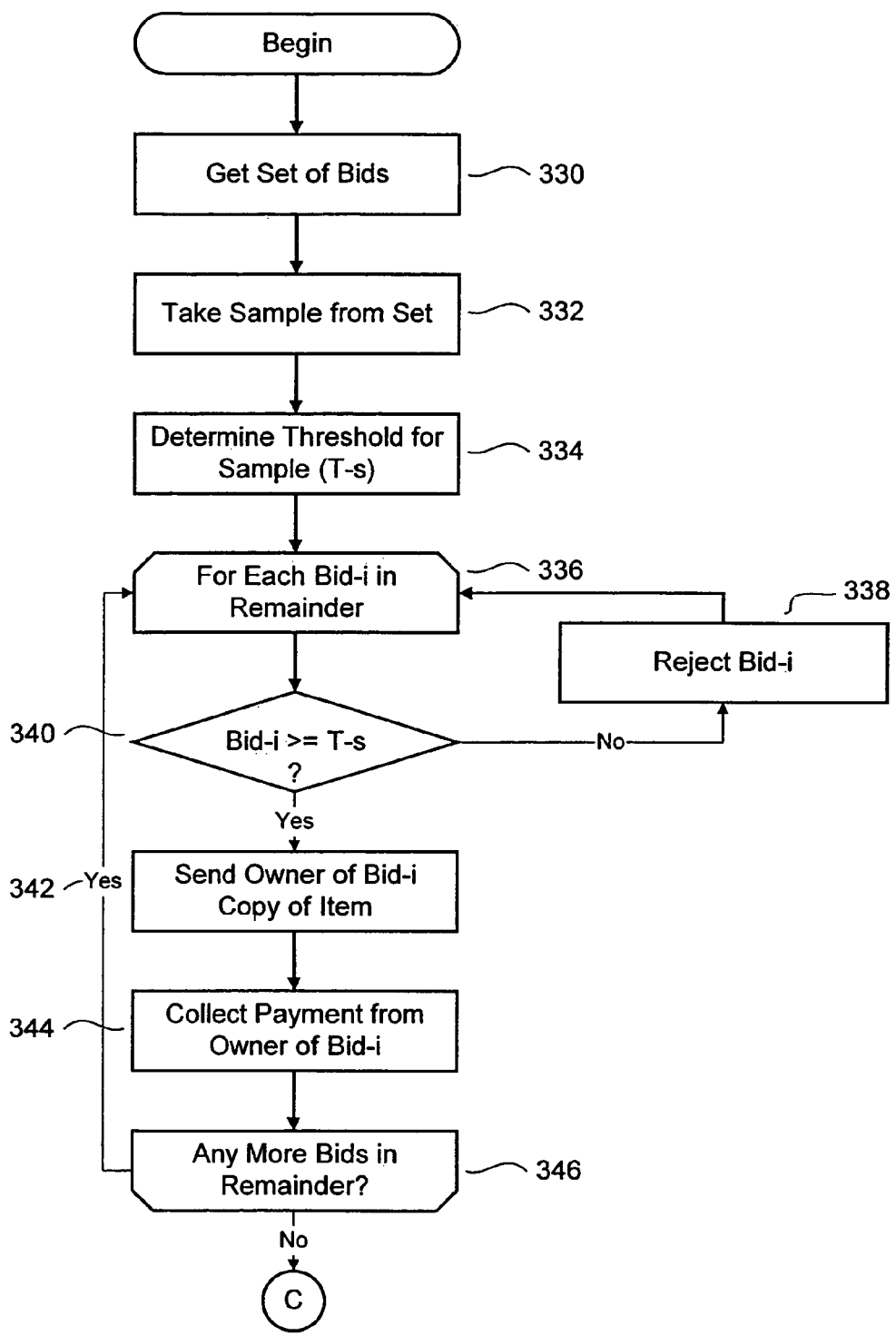
Figure 3C:
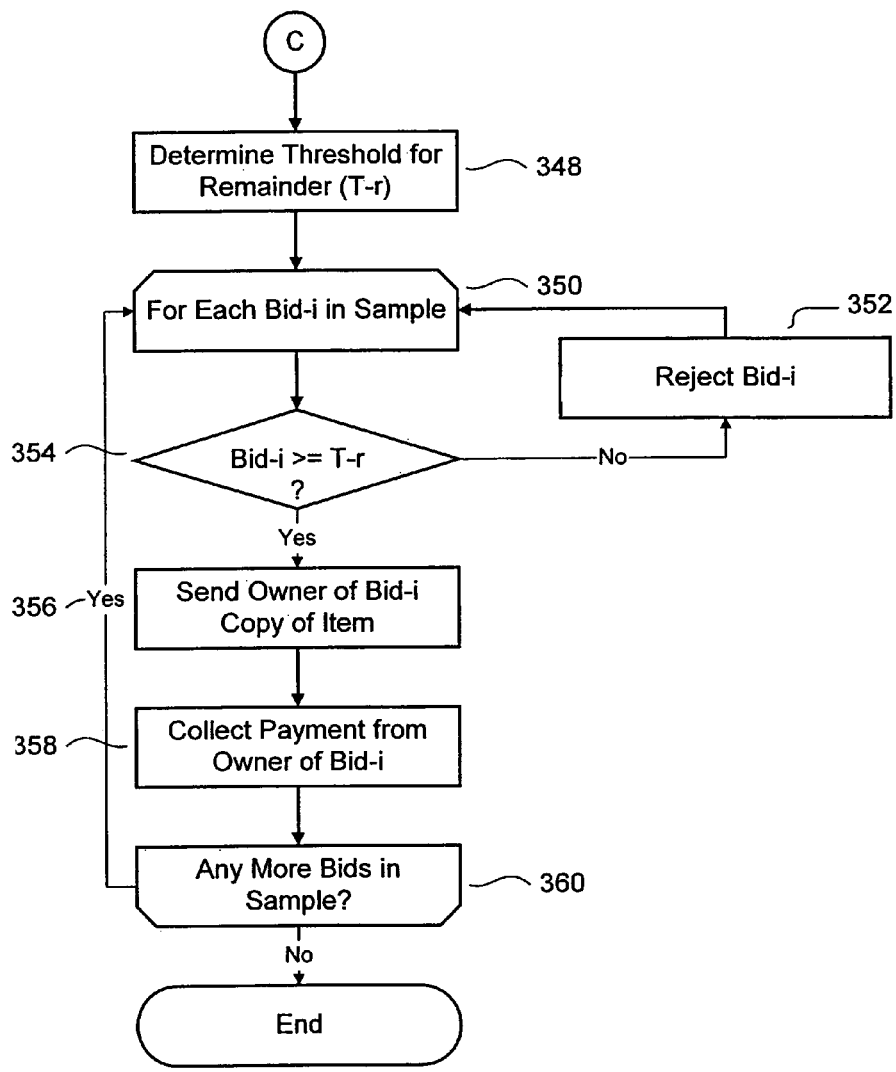

In another embodiment, a dual-priced technique is used to avoid the loss of revenue that results from discarding the bids used to set the threshold. FIGS. 3B and 3C illustrate this technique. In this embodiment, the bids in the sample are not discarded. Instead, a second threshold is determined by analyzing the bids in the remainder (348). This threshold is then used to determine whether the bids in the original sample are winners or losers (350-360). Thus, the threshold used to select each winning bid is chosen independently of the value of the winning bid itself, and thus bidders are incentivized to bid their true utility values. In a preferred implementation of this embodiment, the sample is taken such that it is approximately equal in size to the group of unsampled bids (i.e., the sample and the remainder are of approximately equal size).

One of ordinary skill in the art will appreciate that the order of the blocks shown in FIGS. 3A, 3B, and 3C can be varied without departing from the principles of the present invention. For example, in FIG. 3A blocks 318, 322, and 324 could simply comprise the act of recording the status of $b_i$ (e.g., win or lose), with all of the bids being processed together at the end of the auction (e.g., rejection notifications sent, copies of the auctioned item made, and/or payments processed). It will also be appreciated that in some embodiments, some steps need not be performed. For example, in a lottery embodiment, payment may not need to be collected. Also note that in some embodiments payment can be collected (or at least reserved) when the bids are initially received—payment of a deposit, or demonstration of the ability to pay, being a prerequisite to having a bid considered. In such embodiments, funds can simply be released to the vendor once a bid wins.

The technique illustrated in FIGS. 3B and 3C can be generalized to the case where an arbitrary number of samples are taken from the original set of bids, thresholds for each of the samples are computed, and thresholds from one sample (or set of samples) used to evaluate which bids in another sample win or lose. Accordingly, it will be appreciated that there are numerous ways to apply the techniques disclosed herein, any suitable one or more of which could be used in accordance with the principles of the present invention. For example, the original set of bids could be divided into two groups in numerous different ways: at one extreme, a single bid could be selected at random, and its value used as a threshold against which the other bids are compared, while at another extreme, each bid could be compared to the optimal threshold of a "sample" consisting of the entire set of remaining bids.

FIGS. 4A and 4B illustrate the application of a dual-priced, random-sample, optimal threshold technique to a group of twenty bids. As shown in FIG. 4A, the bids are randomly (or arbitrarily) partitioned into two groups, shown as a shaded group and an unshaded group. Next, the optimal threshold for each group is calculated. As shown in FIG. 4B, the optimal threshold for the shaded group of bids (i.e., the threshold that would yield the greatest revenue if applied to the shaded group) is $2. This threshold is applied to the bids in the unshaded sample, yielding a revenue of $18 (i.e., all unshaded bids of $2 or greater pay $2). Similarly, the optimal threshold for the unshaded sample is determined—in this case it is also $2- and applied to the bids in the shaded sample, yielding a revenue of $16.

Thus, in this example the auction mechanism is able to achieve the same revenue as an optimal fixed pricing scheme, yet by using the auction mechanism the vendor is able to avoid the costs of performing the market research necessary to determine the optimal fixed price. It can be shown that if, for example, the highest bid is small in relation to the total amount of revenue obtainable through optimal fixed pricing, then the expected revenue of a random sample optimal threshold auction will be within a constant factor of the revenue of the optimal single-price auction, and will usually be very close to the revenue obtained using fixed pricing with perfect market information.

Note that "random," as used herein, is intended to encompass pseudo-random, quasi-random, effectively random, or arbitrary processes, in addition to "truly" random processes. One of ordinary skill in the art will appreciate that any suitable random number generation technique can be used in accordance with the teachings of the present invention, including without limitation those set forth in Knuth, *The Art of Computer Programming: Volume 2, Seminumerical Algorithms*, 3d ed., pp. 1-193 (Addison-Wesley 1998), which is hereby incorporated by reference.

Figure 5:
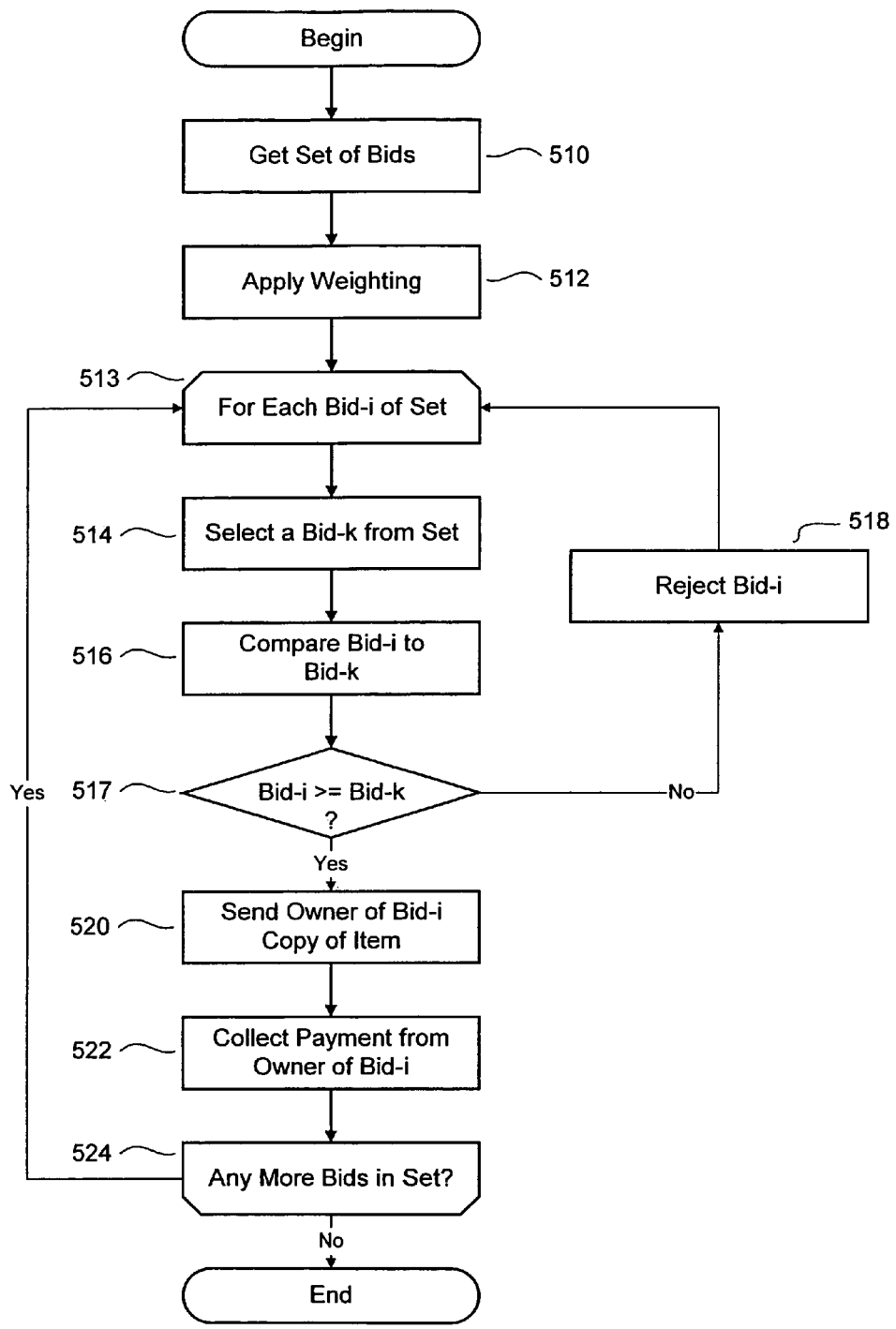
FIG. 5 is a flow chart illustrating a method for conducting an auction in accordance with an embodiment of the present invention.

FIG. 5 is a flow chart illustrating another illustrative method of conducting an auction for digital goods. In this embodiment, an auction mechanism is implemented where for each bid x, a different bid y is selected using a predefined selection process that is effectively independent of x. If y is less than or equal to x, the bidder who bid x wins and pays y. Otherwise the bidder loses Referring to FIG. 5, a set of bids is gathered (510) and weighted using a suitable weighting scheme (512). In a preferred embodiment, the bids are weighted proportionally to their bid value; however, one of ordinary skill in the art will appreciate that other weighting schemes can be used. For example, the weighting scheme need not be linearly proportional to bid value. In other embodiments, no weighting scheme is used.

Referring once again to FIG. 5, each bid, $b_i$, is compared to a randomly selected competing bid, $b_k$ (513-524). In a preferred embodiment, the random selection of a $b_k$ is performed such that bids with higher weighting factors are proportionally more likely to be selected than bids with lower weighting factors. If $b_i >= b_k$ (or, in some embodiments, if $b_i > b_k$), then $b_i$ wins (517). If a bid wins, the winning bidder is sent a copy of the auctioned item (520) and payment is collected (522). If a bid loses, a message to that effect is sent to the bidder (518). The process of selecting a competing bid, $b_k$, comparing it to a given bid, $b_i$, and determining whether $b_i$ wins or loses is repeated for each bid in the original set of bids (524). One of ordinary skill in the art will appreciate that the order of the blocks shown in FIG. 5 can be varied without departing from the principles of the present invention.

FIGS. 6A and 6B illustrate the application of the weighted-pairing auction mechanism described above to a set of ten bids. As shown in FIG. 6A, in a preferred embodiment each bid is assigned a weight proportional to the value of the bid. In the embodiment shown in FIG. 6A, this is accomplished by assigning each bid, $b_i$, a number equal to the sum of all the bid values through $b_i$. Using this weighting scheme, bids can be randomly selected with a probability proportional to the individual bid values simply by randomly generating a number between 1 and $\Sigma$bid_values (in FIG. 6A, a number between 1 and 30) and mapping that number back to its corresponding bid. For example, with the weighting scheme shown in FIG. 6A, a random number, r, maps to the bid, $b_k$, for which $weight_{k-1} < r <= weight_k$. It is to be understood, however, that the weighting scheme shown in FIG. 6A, and the implementation thereof, is provided for purposes of illustration, not limitation, and that any suitable weighting scheme can be used in accordance with the principles of the present invention. For example, a weighted pool of bids could be created by duplicating each bid a number of times proportional to the value of the bid, then selecting each $b_k$ at random from the resulting pool. As another example, in one embodiment the weighting is performed separately for each $b_i$—that is, for each $b_i$ the remaining bids are weighted—which is equivalent to relocating weighting block 512 in FIG. 5 such that it is located between blocks 513 and 514.

FIG. 6B illustrates the result of applying the process shown in FIG. 5 to the bids shown in FIG. 6A. For each bid, $b_i$, a competing bid, $b_k$, is randomly selected using the weighted selection scheme described above. In a preferred embodiment, $b_k$ is selected from the set of all bids except for $b_i$, which can be accomplished by simply rejecting random numbers that map to $b_i$ rather than to a unique $b_k$. Each $b_i$ is compared to its corresponding $b_k$, and a determination is made as to whether $b_i$ wins or loses based on whether $b_i$ is greater than or equal to $b_k$ (or, in other embodiments, whether $b_i$ is greater than $b_k$). The vendor determines the identity of the winning bidders in this manner, collects payment equal to the appropriate value of $b_k$ for each bid, and sends a copy of the auctioned item to each winning bidder. The weighted pairing auction described above is multiple-priced and stable. Moreover, as shown in FIGS. 7, 8, 9, 10, and 11, theoretical and experimental results indicate that this auction performs relatively well in comparison to other stable auction mechanisms.

One way to improve the performance of the weighted pairing mechanism for some bid distributions is to pick a constant, g, and to modify the auction so that $b_i$ wins if it is greater than $g*b_k$, and pays $g*b_k$. In one preferred embodiment, g is a constant between 0 and 1. In this embodiment, the modified auction revenue will be at least g times the original auction revenue, but has the potential to be much larger. In general, the effectiveness of this technique, and the optimal choice of g, will depend on the characteristics of the individual distribution—for example, it has been found that this technique works well for g=0.99 on distributions in which the bids are tightly clustered around a single value.

The performance of the auction mechanisms presented herein will typically vary somewhat according to the shape of the bid distribution curve. FIGS. 7, 8, 9, 10, and 11 compare the performance of optimal fixed pricing (i.e., the performance that could be obtained with perfect market analysis) to the performance of several embodiments of the present invention. In these plots, the performance of various bid mechanisms—measured on the y-axis as a percentage of the revenue obtainable by optimal fixed pricing (F)—is plotted versus the total number of bids in the auction. Curves for the following auction mechanisms are illustrated in FIGS. 7, 8, 9, 10, and 11:

Single-Price Optimal Threshold (SSO). This auction mechanism is discussed in conjunction with FIG. 3A, and is one in which a random sample of sqrt(n) of the n bids are used to set the threshold for the remaining n−sqrt(n) bids, but are then discarded.

Dual-Price Sampling, Optimal Threshold (DSO). This auction mechanism is described above in connection with FIGS. 3B, 3C, 4A, and 4B.

Weighted Pairing (WP). This auction mechanism is described above in connection with FIGS. 5, 6A, and 6B.

Deterministic Optimal Threshold (DOT). This auction mechanism is related to the DSO mechanism discussed in connection with FIGS. 3B and 3C, and is one in which the optimal threshold for a "sample" of n−1 bids is used to determine the outcome of the remaining bid, this process being repeated for each of the n bids. In addition, the performance of non-optimal fixed pricing is illustrated (i.e., FP− and FP+); the curves for FP− and FP+ show the revenue obtained when the optimal fixed price is underestimated by 25% and overestimated by 25%, respectively.

Figure 7:
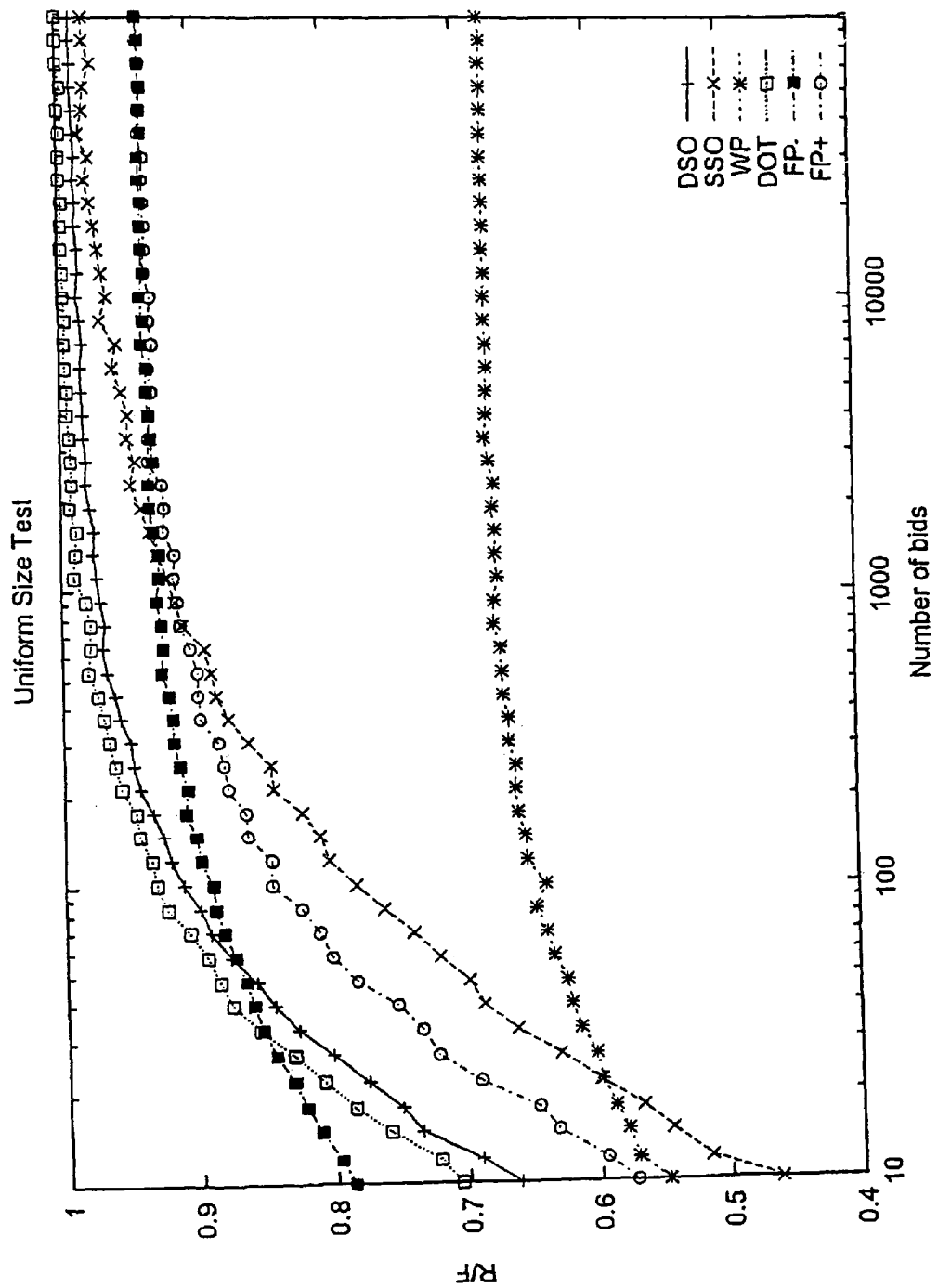
FIG. 7 illustrates the performance of exemplary auction mechanisms when bids are distributed uniformly.
Figure 8:
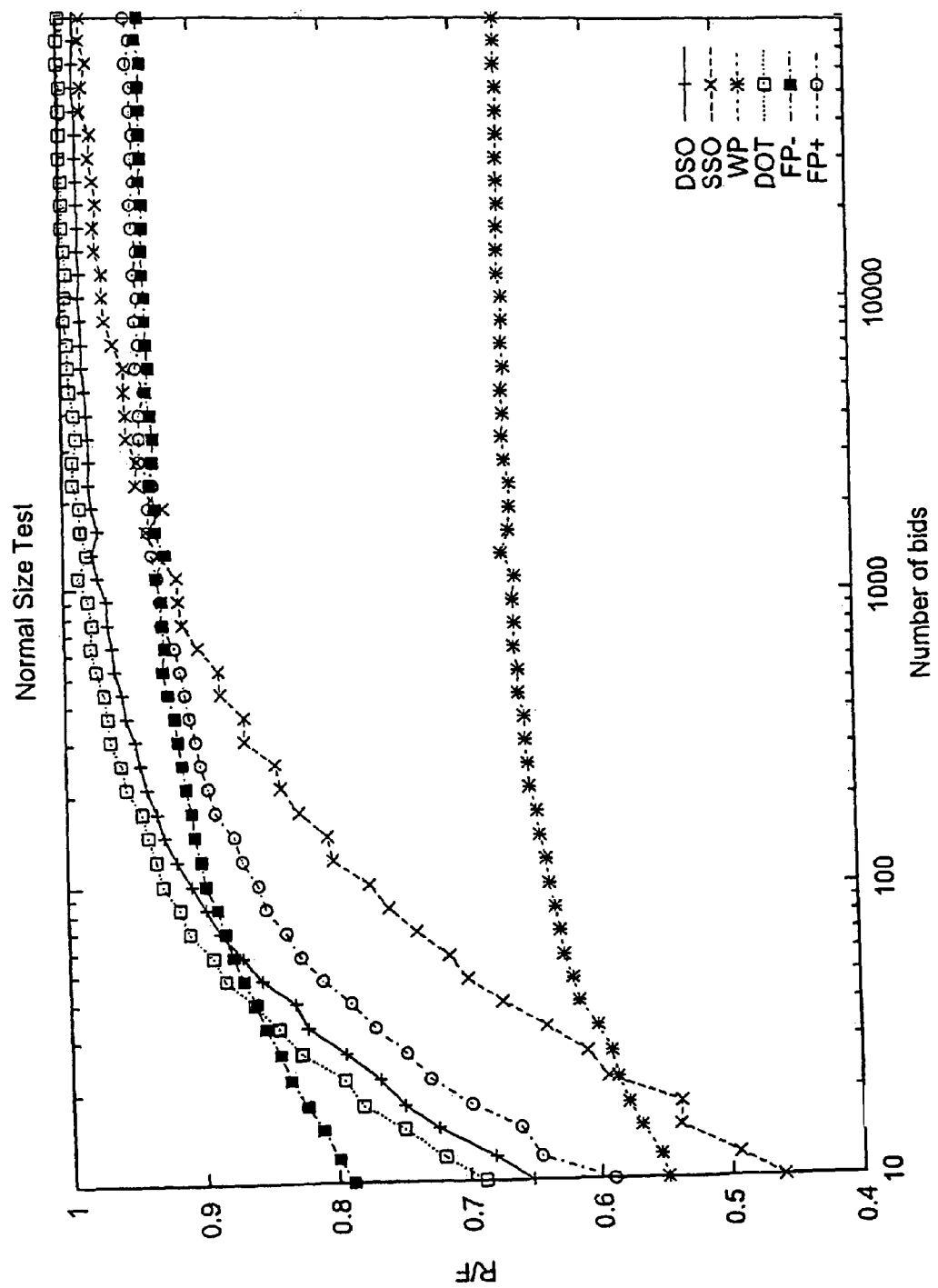
FIG. 8 illustrates the performance of exemplary auction mechanisms when bids are distributed according to a normal distribution.
Figure 9:
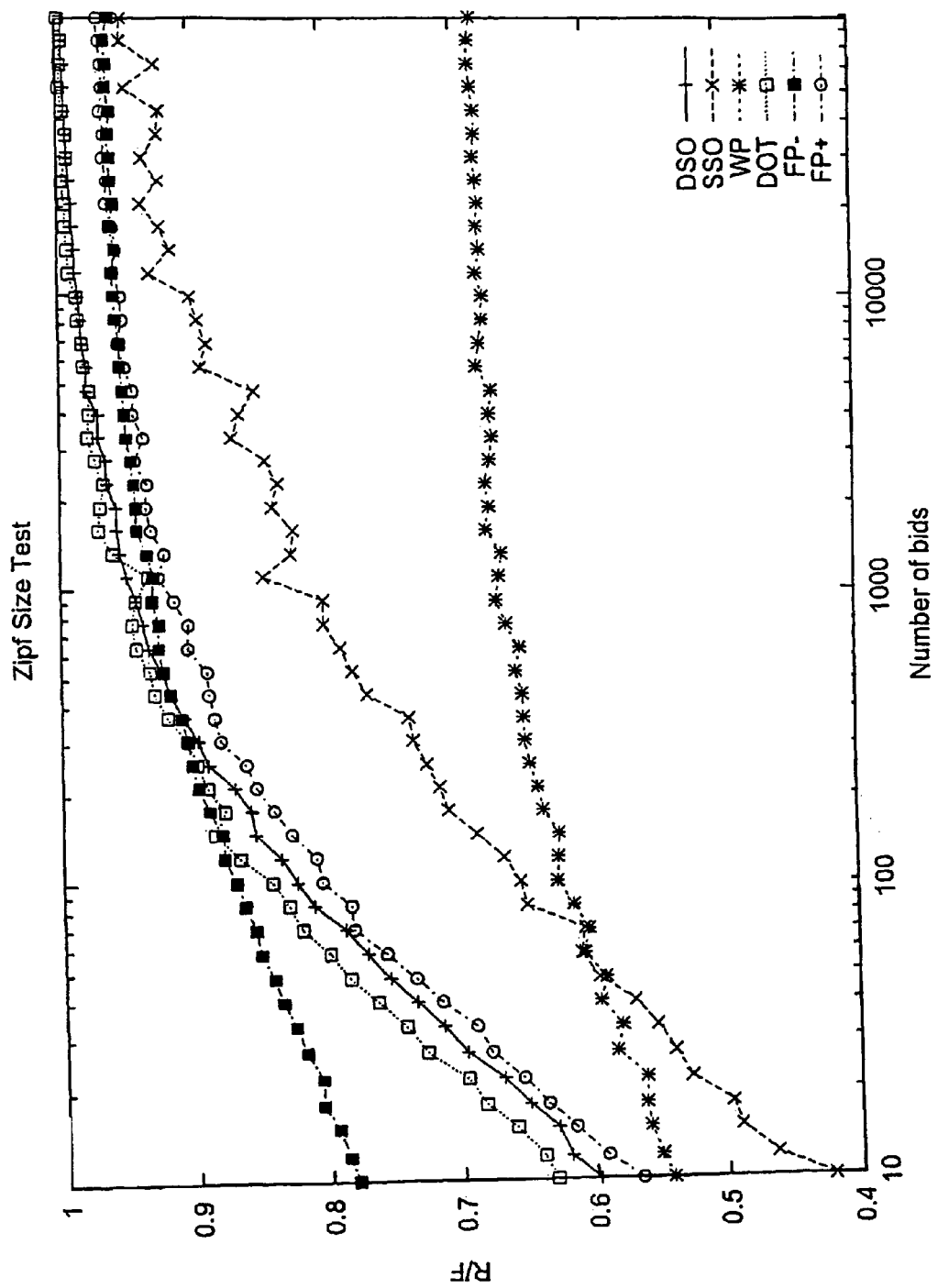
FIG. 9 illustrates the performance of exemplary auction mechanisms when bids are distributed according to a Zipf distribution.
Figure 10:
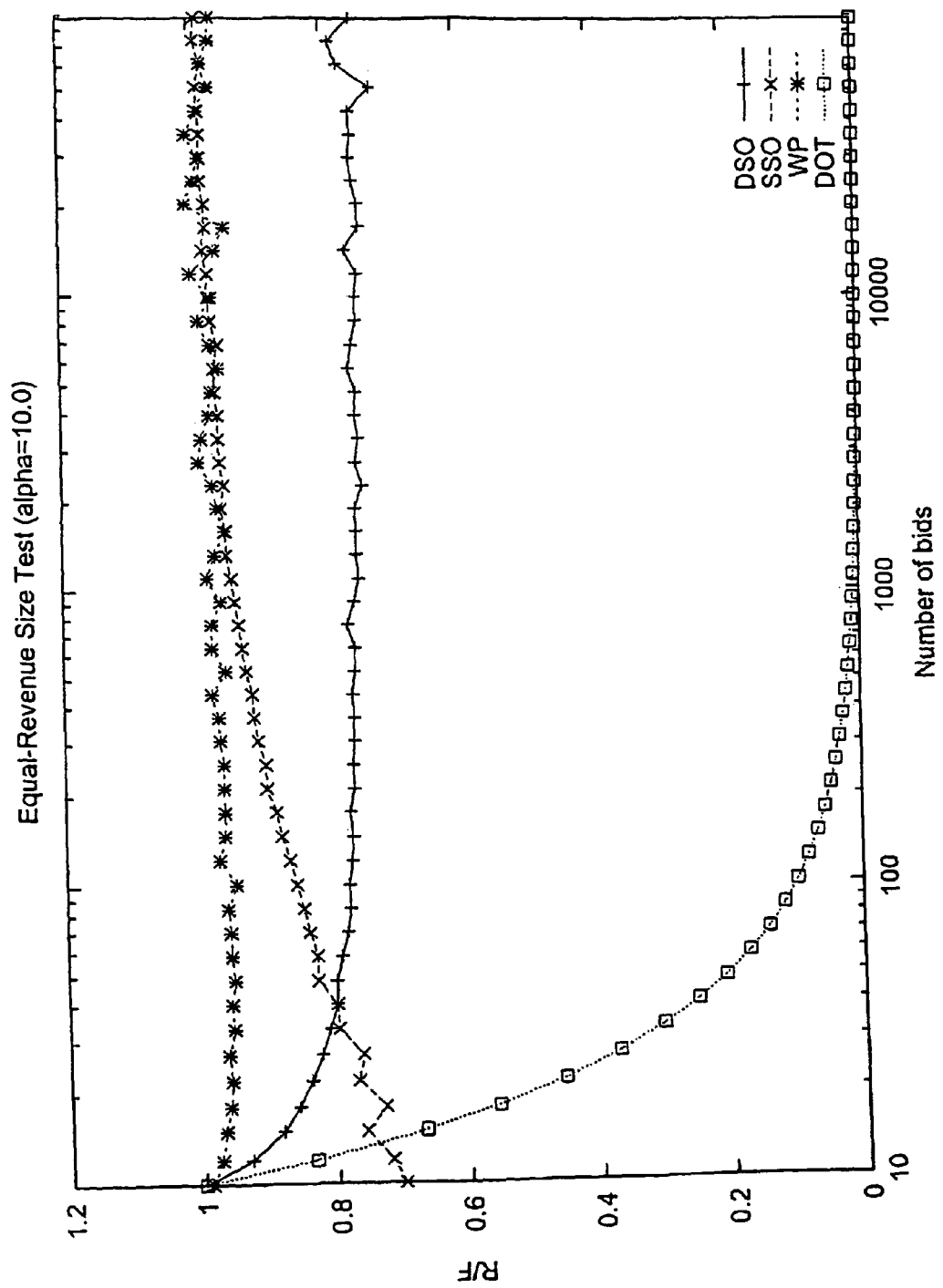
FIG. 10 illustrates the performance of exemplary auction mechanisms when bids are distributed according to an equal-revenue distribution.

FIG. 7 illustrates the performance of the exemplary auction mechanisms when bids are distributed uniformly (e.g., randomly) between a maximum bid of 1 and a minimum bid of 0. FIG. 8 illustrates performance when bids are distributed according to a normal distribution curve with mean of 1 and standard deviation of 1 (negative bids are not included). FIG. 9 illustrates performance when bids are distributed according to a Zipf distribution with $\theta=0.5$. As seen in FIGS. 8, 9, and 10, the random sampling auction mechanisms perform particularly well on the uniform, normal, and Zipf distributions, as these distributions are characterized by the fact that a uniformly-chosen random subset of the bids will, on average, have the same distribution as the original distribution. In particular, it can be seen that for large (or even moderately large) auctions, the auction mechanisms of the present invention perform better than imperfect fixed pricing.

Figure 11:
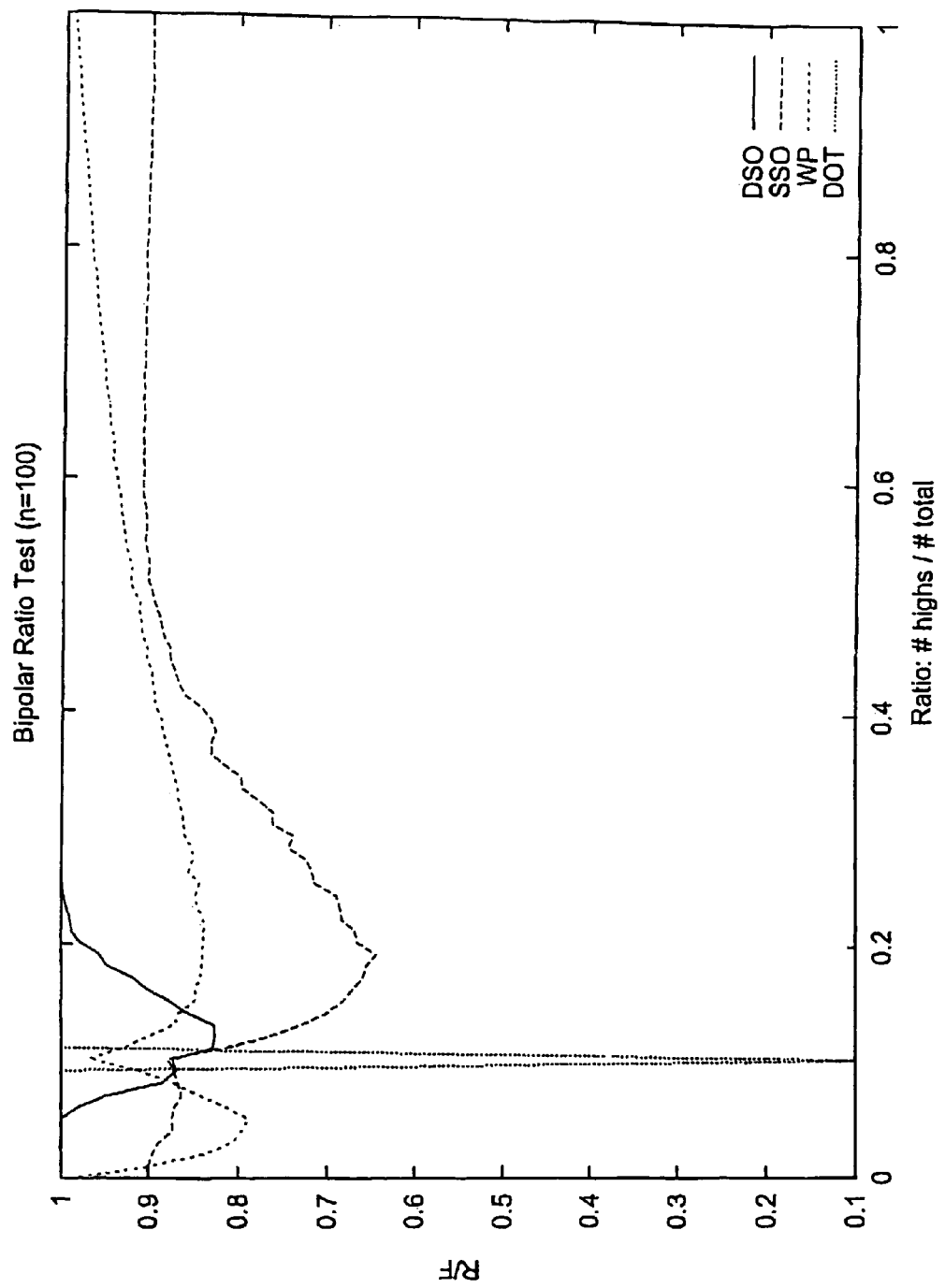
FIG. 11 illustrates the performance of exemplary auction mechanisms when bids are distributed in a bipolar fashion.

In FIG. 10 the distribution is such that the same revenue can be obtained by setting the selling price to any bid value (except for the highest) and satisfying all bids greater than or equal to that value. As seen in FIG. 10, this bid distribution represents a worst-case performance for several of the auction mechanisms. Finally, FIG. 11 illustrates the performance of various auction mechanisms when bids are clustered in a bipolar fashion (i.e., bids are clustered at high and low values). In FIG. 11, the performance of the auction mechanisms are plotted for various bid-cluster configurations.

The information obtained by the auctioneer in a particular auction can be useful in determining the optimal method by which to sell additional copies of the goods in the future. For example, if the auction mechanism encourages bidders to bid their true utility values (i.e., is a stable auction mechanism), the auctioneer will collect valuable data on consumer utility values and the distributions thereof. Using these data, the auctioneer can adapt future sales mechanisms to best match the distributions of utility values observed in the market for the goods in question. Thus, for example, if an auctioneer observes that consumer bids for a particular type of digital goods are distributed according to an equal-revenue distribution, the auctioneer can conduct future auctions for this type of goods using a variant of the weighted-pairing auction mechanism or the single-sample, optimal threshold mechanism, both of which have been found to perform well on such a distribution. Alternatively, the vendor could simply set a fixed price at the optimal level derived from the auction data.

As yet another example, if a bipolar distribution were observed, the vendor could capitalize on consumer price discrimination by offering a modified form of the goods which would be less appealing to consumers who place a high utility value on the item, but which would still be appealing to consumers who place a low utility value on the item. For example, the vendor could create a version of the goods that did not include some of the features or functions valued by the high-end customers. The vendor could then hold separate auctions for each class of goods, setting a reserve price on the high-end version of the goods, the reserve price being greater than the utility values exhibited by the consumers of the low-end version. Thus, the use of a stable auction mechanism enables the vendor to accurately observe market distributions and to adapt in an optimal fashion.

Accordingly, in one embodiment auction application software 254 includes data analysis modules 262, which are operable to record the bid distributions observed in actual auctions and to determine an optimal auction mechanism and/or fixed price for the observed bid distribution. In one embodiment, this determination is performed by stepping through a library of auction mechanisms, and iteratively optimizing the auction variables to maximize the revenue derived from the auction. For example, the sample size of the single-price optimal threshold mechanism could be optimized; the choice of scaling factor g could be optimized; and so forth.

Thus, several exemplary techniques have been presented for conducting an auction for unlimited (or effectively unlimited) supply goods. One of ordinary skill in the art will appreciate that numerous variations can be made to the exemplary techniques set forth herein without departing from the principles of the present invention. Moreover, it should be understood that while the techniques described herein can be advantageously applied in the context of an auction for unlimited supply goods, these techniques are readily adaptable to the context of limited supply goods as well. For example, without limitation, the dual-price optimal threshold mechanism can be adapted to an auction for k items by simply selecting the optimal threshold for each sample to yield approximately k/2 winning bids. If too many bids are selected, bids can be randomly rejected until only k bids remain. One of ordinary skill in the art will appreciate that other auction mechanisms presented herein can be similarly adapted for use in the context of limited supply goods.

Moreover, while the discussion has focused on the case in which the marginal cost of producing copies of the auctioned item is negligible, the systems and methods described herein are readily adaptable to situations where this is not the case. For example, if the marginal cost of producing an item is v, the vendor can simply subtract v from all bids, automatically reject all negative bids, and then conduct the auction using the remaining bids in the manner previously described (with v added back to each bid). This technique can thus be used to enforce a vendor's "reserve" price.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered illustrative and not restrictive, and the invention is not to be limited to the details given herein, but may be modified within the scope and equivalents of the appended claims.

What is claimed is:

1. A system for vending copies of a digital work, the system including:
 a computer system for receiving a plurality of bids from a plurality of bidders, wherein a maximum number of copies of the digital work subject to vending is not specified in advance of receiving the plurality of bids;
 a memory for storing the bids;
 bid sampling logic for selecting (i) a bid from a bidder, and (ii) a sample of one or more bids from the plurality of bids, wherein the sample does not include the bid from the bidder;
 a processor for deriving a threshold from the sample of bids, and for comparing the bid of the bidder with the threshold to determine whether to vend a copy of the digital work to the bidder as a function of the comparison, the threshold chosen to maximize a quantity obtained by multiplying (a) a number of bids in the sample that exceed the threshold by (b) a bid value of a highest bid in the sample that is less than or equal to the threshold; and
 a network interface unit for sending a copy of the digital work to the bidder.

2. The system of claim 1, wherein the system obtains payment from the bidder in an amount equal to the threshold.

3. The system of claim 1, wherein the sample of bids is selected from the plurality of bids in a random fashion.

4. The system of claim 3, wherein the system obtains payment from the bidder in an amount equal to the threshold.

5. The system of claim 1, further including payment processing software that collects payment for the digital work from the bidder.

6. The system of claim 5, wherein the sample of bids is selected from the plurality of bids in a random fashion.

7. The system of claim 1, wherein the network interface is operable to send a copy of the digital work to the bidder in a secure manner.

8. The system of claim 1, wherein the sample comprises a single bid, and wherein the threshold comprises the bid value of the single bid.

9. The system of claim 1, wherein the sample of bids is selected from the plurality of bids in a random fashion.

10. The system of claim 9, wherein the system obtains payment from the bidder in an amount equal to the threshold.

11. The system of claim 1, wherein the processor compares the bid with the threshold in order to determine whether to distribute a copy of the digital work to the bidder.

12. The system of claim 1, wherein the bid sampling logic is configured to select a new bid and a new sample of one or more bids from the plurality of bids each time a new bid is submitted by a new bidder.

13. The system of claim 12, wherein each new sample of bids is selected from the plurality of bids in a random fashion.

14. The system of claim 12, wherein the new sample of bids includes each of the plurality of bids except for the bids included in the previous samples.

15. The system of claim 1, further including a payment processing component that processes payment information regarding the digital work.

16. The system of claim 15, wherein the payment processing component is a server.

17. The system of claim 15, wherein the payment processing component is a program of instructions.

18. The system of claim 17, wherein the payment from the bidder is equal in amount to the threshold derived from the sample of bids.

* * * * *